United States Patent [19]

Cavazos

[11] Patent Number: 4,771,546
[45] Date of Patent: Sep. 20, 1988

[54] DEVICE FOR ASCERTAINING THE CAMBER AND CASTER POSITIONS OF VEHICLE FRONT WHEELS

[76] Inventor: Gregorio Cavazos, 1013 Bayou Shore Dr., Galveston, Tex. 77551

[21] Appl. No.: 45,470

[22] Filed: May 4, 1987

[51] Int. Cl.[4] ............................................ G01B 13/195
[52] U.S. Cl. .................................. 33/336; 33/203.18; 33/391; 33/402
[58] Field of Search ............... 33/203.18, 203.19, 335, 33/336, 337, 391, 395, 402

[56] References Cited

U.S. PATENT DOCUMENTS

| | | | |
|---|---|---|---|
| 309,792 | 12/1884 | McGregor | 33/402 |
| 1,653,249 | 12/1927 | Bennett | 33/335 |
| 1,931,490 | 10/1933 | Fisher | 33/391 |
| 2,029,364 | 2/1936 | Duby | 33/335 |
| 2,357,463 | 9/1944 | Fields | 33/336 |
| 2,586,194 | 2/1952 | Wochner | 33/335 |
| 4,084,328 | 4/1978 | Shai | 33/391 |

Primary Examiner—William D. Martin, Jr.
Attorney, Agent, or Firm—Brady, O'Boyle & Gates

[57] ABSTRACT

A device for ascertaining the camber and caster positions of vehicle front wheels including a base frame having a depending plate freely pivotal on an axis normal to the base frame and a depending pointer freely pivoted to the plate on an axis normal to the first axis. A scale is adjustably mounted on the lower end of the plate and a lock is provided on the base frame for securing the plate from pivotal movement while not in use. The outer ends of the base frame are provided with extension plates for engaging the side of relatively small wheels, and flange members are removably mounted on the extension plates for engaging a wheel rim of relatively large wheels. A handle is connected to the base frame so that the device may be manually placed against the vehicle wheel.

8 Claims, 2 Drawing Sheets

DEVICE FOR ASCERTAINING THE CAMBER AND CASTER POSITIONS OF VEHICLE FRONT WHEELS

BACKGROUND OF THE INVENTION

The device of the present invention for ascertaining the camber and caster positions of vehicle front wheels is similar to the device disclosed in U.S. Pat. No. 2,357,463 to Fields, dated Sept. 5, 1944; however, the device of the present invention is an improvement on the Fields device in that the device of the present invention includes a handle so that the device may be manually placed against the vehicle wheel; whereas, Fields' device is bolted to the wheel. The device of the present invention also includes flange members detachably connected to the base frame or bar for engaging the wheel rim whereby the camber and caster of relatively large truck wheels can be ascertained; whereas, Fields' device is adapted for use on relatively small wheels. The device of the present invention also includes a lock to prevent pivotal movement of the plate when the device is not in use.

DESCRIPTION OF THE PREFERRED EMBODIMENT

Figure 1:
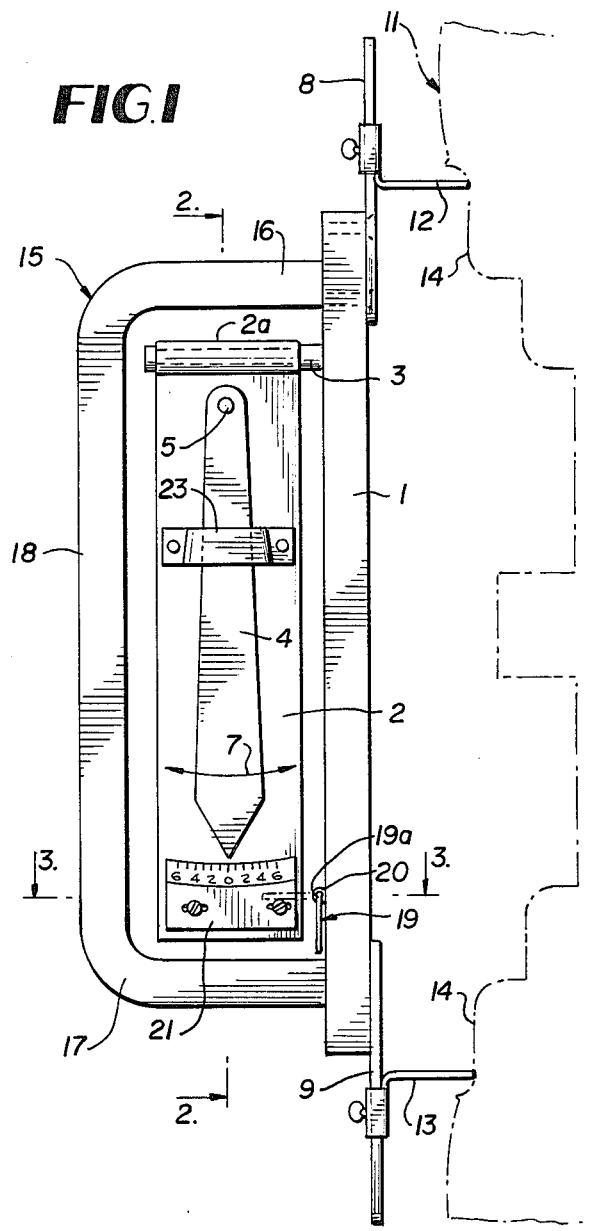
FIG. 1 is an end elevational view showing the device of the present invention engaging the rim of a wheel.
Figure 2:
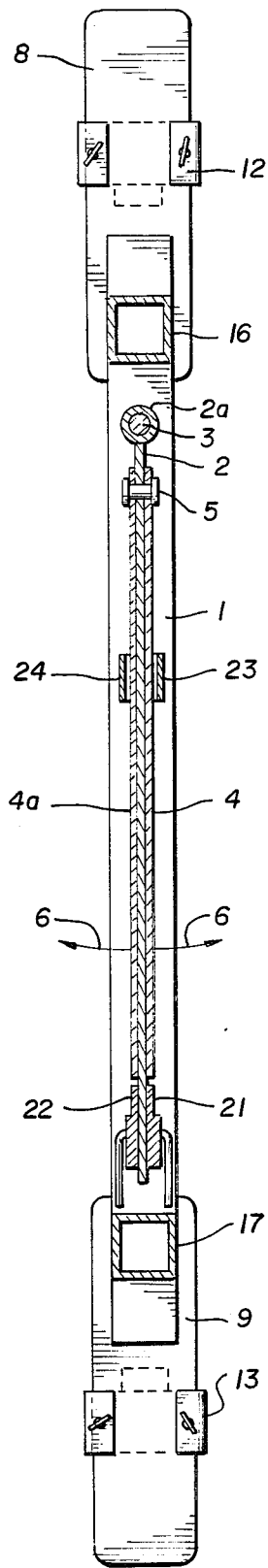
FIG. 2 is an enlarged view taken along line 2—2 of FIG. 1.

Referring to the drawings and more particularly to FIGS. 1 and 2, the device of the present invention comprises a base frame or bar 1 having a depending plate 2 provided with an integral sleeve 2a on the upper end thereof for pivotally mounting the plate on a shaft 3 extending from the base frame 1 and perpendicular thereto. A depending pair of pointers 4, 4a are pivotally connected to opposite sides of the plate 2 by a pin 5 extending through the plate and normal or perpendicular to shaft 3. By this construction and arrangement, the depending plate 2 is freely pivotal, on an axis defined by the shaft 3, in the direction of the arrows 6 in FIG. 2, and the pointers 4, 4a are freely pivotal, on an axis defined by pin 5, in the direction of the arrows 7 in FIG. 2.

Figure 4:
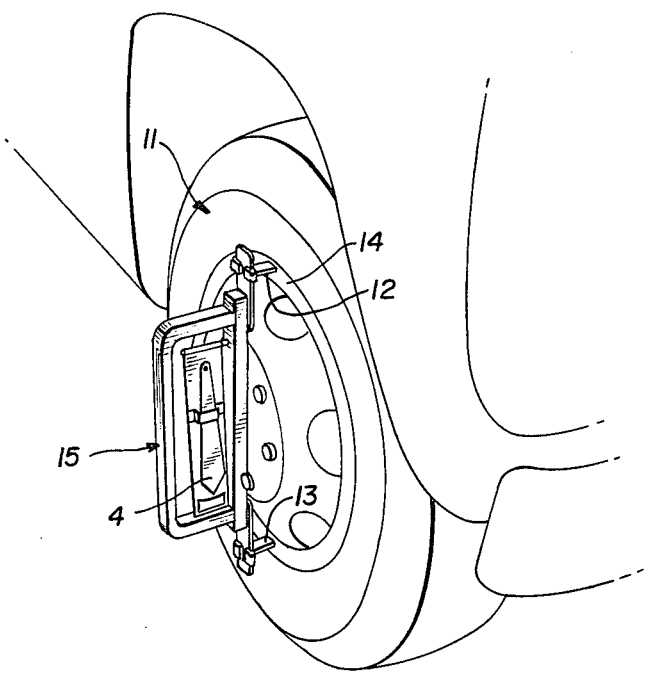
FIG. 4 is a perspective view of the device engaging the rim of a wheel.
Figure 5:
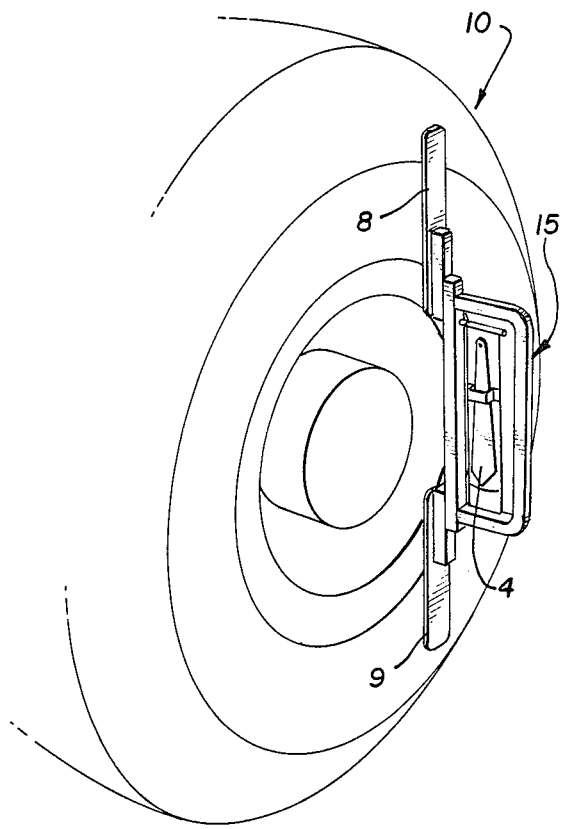
FIG. 5 is a perspective view of the device engaging the side of a wheel.

Each end of the base frame is provided with an extension plate 8 and 9 adapted to engage the side of relatively small wheels 10, as shown in FIG. 5. When the caster and camber are to be ascertained for truck wheels, as shown in FIGS. 1 and 4, flange members 12 and 13 are slidably and adjustably mounted on the respective extension plates 8 and 9, the free ends of the flange members being adapted to engage the rim 14 of the wheel 11.

In order that the device of the present invention can be manually held against the wheel being measured, a tubular handle 15 is provided having arm portions 16, 17 rigidly connected to the upper and lower end portions of the base frame 1, and a leg portion 18 interconnecting the arm portions 16, 17. As will be seen in FIG. 2, the plate 2, shaft 3 are contained within or surrounded by the handle 15 and base frame 1.

Figure 3:
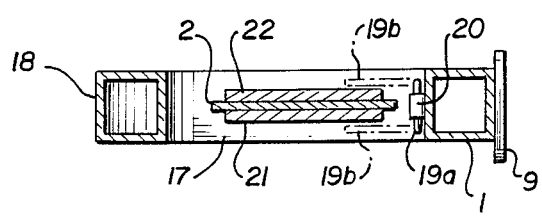
FIG. 3 is a view taken along line 3—3 of FIG. 1.

In order to prevent pivotal movement of the plate 2 while not in use, a lock member 19 is provided at the lower end portion of the base frame 1. The lock member comprises a bifurcated bracket 19a pivotally mounted to the frame 1 as at 20, the bracket being pivotal from the solid line position shown in FIGS. 1 and 3, to the dotted line position wherein the arms 19b of the bracket engage opposite sides of the plate 2 to prevent the pivotal movement of the plate.

To complete the structure of the device of the present invention, a pair of scales 21 and 22 are adjustably mounted, through a bolt and slot arrangement, on the lower end of the plate 2. A pair of brackets 23 and 24 are secured to the upper end portion of the plate on opposite sides thereof, and straddle the pointers 4, 4a to limit the swinging of the pointers about the pin 5.

While the plate 2, as shown in FIGS. 1 and 2, is pivotally mounted to the shaft 3 by the sleeve 2a integrally connected to the upper end of the plate, FIG. 4 illustrates another embodiment for hingedly connecting the plate 2 to the shaft 3. In this embodiment, a pair of hinge sleeves 25, 26 are provided, the sleeves having apertured ear portions 25a, 26a adapted to be bolted or fastened through apertures 2b, 2c provided in the plate 2. Aperture 2c is formed as a slot so that the plate 2 can be adjusted to a plumb position.

Figure 7:
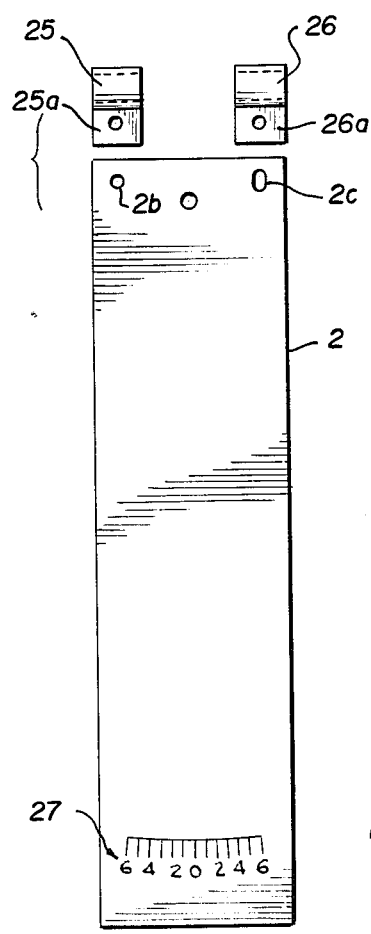
FIG. 7 is an elevational view of a depending plate having an integral scale on the lower end and adjustable pivot brackets at the upper end thereof.
Figure 6:
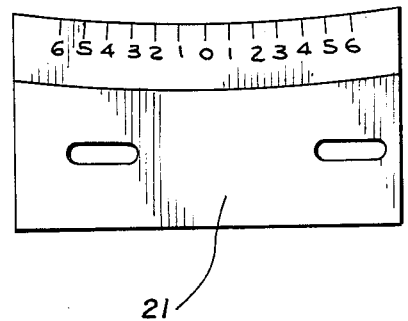
FIG. 6 is an elevational view of a scale adapted to be adjustably mounted on the lower end of the device's depending plate.

While the scales 21 and 22, as shown in FIGS. 1 and 6, are adapted to be adjustably mounted on the plate 2, the scales can be integrally connected to the lower portion of the plate, as shown at 27 in FIG. 7.

In using the device of the present invention, the operator manually places the device against the wheels as shown in FIGS. 4 and 5 and the camber can be read on the scales 21, 22 below the pointers 4, 4a to determine the necessary work to adjust or align the wheels to specification.

To determine the caster of the vehicle front wheels, the wheels are first turned in a first direction as far as they will go, and the operator places the device against the wheels as shown in FIGS. 4 and 5, and adjusts the wheels to the desired inclination. The operator removes the device from the wheel and the wheels are then turned in the opposite direction as far as they will go. The operator then repeats the operation as noted above when the wheels were turned in the first direction.

From the above description, it will be appreciated by those skilled in the art that the device of the present invention provides an improved device for ascertaining the camber and caster positions of vehicle front wheels, and which can be easily handled by the operator for use not only on relatively small wheels but also relatively large wheels, such as truck wheels.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a device for ascertaining the camber and caster positions of vehicle front wheels of the type having a base frame, a plate freely pivotal on an axis normal to the base frame, a depending pointer freely pivoted to the plate on an axis normal to the first axis, and a scale on the lower end portion of the plate below the pointer, the improvement comprising a handle connected to the base frame, whereby the device may be manually held against the wheel being measured and lock means mounted on the base frame and operatively connected to the plate to prevent pivotal movement of the plate when the device is not in use, said lock means comprising a bifurcated bracket having the bight portion thereof pivotally mounted on the base frame, the arms of said bracket being adapted to engage opposite sides of said plate.

2. In a device for ascertaining the camber and caster positions of vehicle front wheels of the type having a base frame, a plate freely pivotal on an axis normal to the base frame, a depending pointer freely pivoted to the plate on an axis normal to the first axis, and a scale on the lower end portion of the plate below the pointer, the improvement comprising a tubular handle having spaced, parallel arm portions connected to opposite end portions of the base frame and extending perpendicular thereto, and a leg portion interconnecting the arm portions whereby the device may be manually held against the wheel being measured.

3. In a device for ascertaining the camber and caster positions of vehicle front wheels of the type having a base frame, a plate freely pivotal on an axis normal to the base frame, a depending pointer freely pivoted to the plate on an axis normal to the first axis, and a scale on the lower end portion of the plate below the pointer, the improvement comprising a handle connected to the base frame, whereby the device may be manually held against the wheel being measured, and wherein the first axis comprises a shaft fixedly connected to the base frame and extending perpendicular thereto, and a pair of hinge sleeves journaled on said shaft, each sleeve having an apertured ear portion, a pair of apertures provided in the upper portion of the plate adapted to be aligned with apertures in said ear portions, whereby fasteners are adapted to extend through said aligned apertures for mounting the plate on said shaft, one of the apertures in the upper portion of the plate being elongated, whereby the plate can be adjusted to a plumb position.

4. In a device according to claim 2, wherein extension plates are connected to each end of the base frame for engaging the side of a wheel being measured.

5. In a device according to claim 4, wherein a flange member is slidably and adjustably mounted on each extension plate for engaging the rim of a wheel being measured.

6. In a device according to claim 2, wherein lock means is mounted on the base frame and operatively connected to the plate to prevent pivotal movement of the plate when the device is not in use.

7. In a device according to claim 6, wherein said lock means comprises a bifurcated bracket having the bight portion thereof pivotally mounted on the base frame, the arms of said bracket being adapted to engage opposite sides of said plate.

8. In a device according to claim 2, wherein the first axis comprises a shaft fixedly connected to the base frame and extending perpendicular thereto, and a pair of hinge sleeves journaled on said shaft, each sleeve having an apertured ear portion, a pair of apertures provided in the upper portion of the plate adapted to be aligned with apertures in said ear portions, whereby fasteners are adapted to extend through said aligned apertures for mounting the plate on said shaft, one of the apertures in the upper portion of the plate being elongated, whereby the plate can be adjusted to a plumb position.

* * * * *